United States Patent
Thomas et al.

(10) Patent No.: US 12,330,550 B2
(45) Date of Patent: Jun. 17, 2025

(54) LIGHTING DEVICE FOR A MOTOR VEHICLE, MOTOR VEHICLE AND METHOD FOR OPERATING A LIGHTING DEVICE

(71) Applicant: AUDI AG, Ingolstadt (DE)

(72) Inventors: Werner Thomas, Oberwöhr (DE); Ernst Reiter, Ingolstadt (DE); Ashley Gleave, Buxheim (DE); Christoph Häussinger, Eichstätt (DE)

(73) Assignee: AUDI AG, Ingolstadt (DE)

( * ) Notice: Subject to any disclaimer, the term of this patent is extended or adjusted under 35 U.S.C. 154(b) by 310 days.

(21) Appl. No.: 18/001,189

(22) PCT Filed: Apr. 8, 2021

(86) PCT No.: PCT/EP2021/059135
§ 371 (c)(1),
(2) Date: May 26, 2023

(87) PCT Pub. No.: WO2021/249679
PCT Pub. Date: Dec. 16, 2021

(65) Prior Publication Data
US 2023/0294594 A1     Sep. 21, 2023

(30) Foreign Application Priority Data
Jun. 8, 2020 (DE) .................. 10 2020 115 198.5

(51) Int. Cl.
*B60Q 1/14* (2006.01)
*F21S 43/145* (2018.01)
(Continued)

(52) U.S. Cl.
CPC .......... *B60Q 1/1415* (2013.01); *F21S 43/145* (2018.01); *H05B 45/10* (2020.01);
(Continued)

(58) Field of Classification Search
CPC ............ B60Q 1/1415; B60Q 2300/054; B60Q 2400/30; B60Q 2900/50; B60Q 1/2607;
(Continued)

(56) References Cited

U.S. PATENT DOCUMENTS 8,564,205 B2    10/2013   Roberts et al.
10,823,353 B1 *   11/2020   Battaglia ................. F21S 41/30
(Continued)

FOREIGN PATENT DOCUMENTS

CN     205468755 U    8/2016
DE     19945775 A1    4/2001
(Continued)

OTHER PUBLICATIONS

International Search Report and Written Opinion of the International Searching Authority directed to International Patent Application No. PCT/EP2021/059135, mailed Jul. 26, 2021; 24 pages.
(Continued)

*Primary Examiner* — Abdullah A Riyami
*Assistant Examiner* — Syed M Kaiser
(74) *Attorney, Agent, or Firm* — Sterne, Kessler, Goldstein & Fox P.L.L.C.

(57) ABSTRACT

The present disclosure relates to a lighting device for a motor vehicle having at least one exterior light and a control device. The exterior light has an illuminated area having at least two independently controllable segments, each comprising at least one light source, wherein the control device is designed to operate the exterior light in at least two operating modes, with each of which a geometric manifestation of the exterior light, defined by the light sources operated in the operating mode, is associated such that the total luminous intensity of the exterior light is within a range limited by a minimum value and a maximum value.

16 Claims, 5 Drawing Sheets

(51) Int. Cl.
*F21W 103/55* (2018.01)
*H05B 45/10* (2020.01)
*H05B 45/60* (2022.01)

(52) U.S. Cl.
CPC ....... *H05B 45/60* (2020.01); *B60Q 2300/054* (2013.01); *B60Q 2400/30* (2013.01); *B60Q 2900/50* (2022.05); *F21W 2103/55* (2018.01)

(58) Field of Classification Search
CPC ............ B60Q 2400/10; B60Q 2400/20; B60Q 1/0041; F21S 43/145; F21S 41/663; H05B 45/10; H05B 45/60; F21W 2103/55
See application file for complete search history.

(56) References Cited

U.S. PATENT DOCUMENTS

| | | | |
|---|---|---|---|
| 11,236,882 B2 | 2/2022 | Maruyama et al. | |
| 2018/0180243 A1* | 6/2018 | Na | F21S 41/68 |
| 2020/0384240 A1* | 12/2020 | Linder | A61M 21/02 |
| 2021/0136899 A1* | 5/2021 | Elwell | F21S 4/28 |

FOREIGN PATENT DOCUMENTS

| | | | | |
|---|---|---|---|---|
| DE | 10011843 A1 | 9/2001 | | |
| DE | 102011076330 A1 | 11/2012 | | |
| DE | 102012001011 A1 | 7/2013 | | |
| DE | 102012004759 A1 | 9/2013 | | |
| DE | 112012002240 T5 | 4/2014 | | |
| DE | 102014110776 A1 | 2/2015 | | |
| DE | 102013223717 A1 | 5/2015 | | |
| DE | 102014017354 A1 | 5/2016 | | |
| DE | 102016215578 A1 | 2/2018 | | |
| DE | 102017110170 A1 | 11/2018 | | |
| EP | 2908609 A1 | 8/2015 | | |
| FR | 3086731 A1 | 4/2020 | | |
| GB | 2405755 A | 3/2005 | | |
| WO | WO-2016020203 A1 * | 2/2016 | ........... | B60Q 1/2607 |
| WO | WO 2019073994 A1 | 4/2019 | | |

OTHER PUBLICATIONS

International Preliminary Report on Patentability directed to International Patent Application No. PCT/EP2021/059135, issued Dec. 13, 2022; 19 pages.

* cited by examiner

LIGHTING DEVICE FOR A MOTOR VEHICLE, MOTOR VEHICLE AND METHOD FOR OPERATING A LIGHTING DEVICE

TECHNICAL FIELD

The present disclosure relates to a lighting device for a motor vehicle, having at least one exterior light and a control device, wherein the exterior light has an illuminated area having at least two independently controllable segments, each comprising at least one light source. In addition, the present disclosure relates to a motor vehicle and a method for controlling such a lighting device.

BACKGROUND

Motor vehicles usually have a plurality of exterior lights which are at least partially designed for better visibility of the motor vehicle during the day and/or at night, for the purpose of improving the vision of a passenger and/or for signaling to other road users. Examples of such exterior lights are rear lights (also referred to as tail lights or tail lamps), daytime running lights, headlights, brake lights and direction indicators. Exterior lights on motor vehicles nowadays are designed to meet any local or country-specific legal requirements for light intensity, attachment height, switching logic and further parameters, which may be referred to collectively as light values.

However, a plurality of exterior lights, in particular those conducive to better visibility by other road users, are also used as a differentiating design feature for vehicle manufacturers and/or vehicle designers. This development has been promoted in particular by new concepts of exterior lights which utilize light-emitting diodes (LEDs), organic light-emitting diodes (OLED) and/or lasers. These illumination technologies for realizing the light sources of the exterior lights make it possible to combine, for example, legal requirements for the light function, specifically the light values, and design requirements, to provide a customized exterior light design for motor vehicles.

This means that exterior lights currently known for motor vehicles are designed such that both the particular legal requirements for the light functions, for example daytime running light or rear light, and also the comfort and/or driver assistance functions, for example glare-free high beam, cornering light and dynamic turn signal light, may be implemented together with a fixed visual layout, i.e., a design. However, in the course of increasing functional enrichment and digitization, it is disadvantageous that previous lighting devices for motor vehicles only allow for a fixed, predefined lighting design. This means design differentials, in particular with regard to the geometric appearance of an exterior light, are mapped via various hardware variants which utilize differently arranged light sources and/or different types of light sources. The most visually sophisticated design is usually coupled with the highest equipment variant.

BRIEF DESCRIPTION OF DRAWINGS/FIGURES

DETAILED DESCRIPTION

Figure 1:
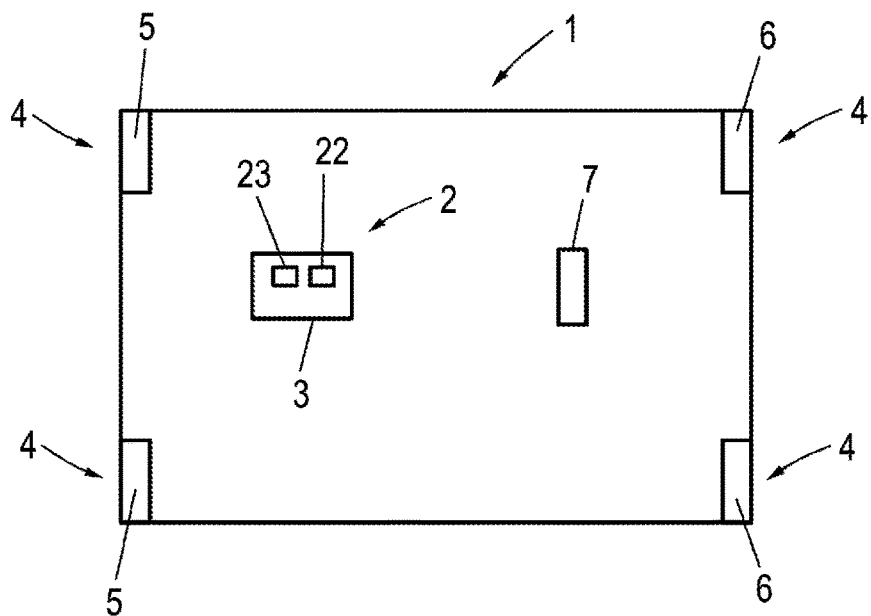
FIG. 1 illustrates a schematic diagram of a motor vehicle according to the present disclosure.

The present disclosure is therefore based on the object of specifying a lighting device that is improved in comparison.

In order to achieve this object, in a lighting device of the type mentioned above, it is provided according to the present disclosure that the control device for operating the exterior light in at least two operating modes, to each of which a geometric manifestation of the exterior light defined by the light sources operated in the operating mode is associated, is designed such that the total luminous intensity of the exterior light is in a range limited by a minimum value and a maximum value.

Within the scope of the present disclosure, it has been recognized that new light technologies for exterior lights providing a segmented control, allow the generation of switchable exterior surface lights which are divided into independently controllable segments, which, by means of different electrical control, i.e., use of different operating modes, allow different optical appearances of the exterior light, at times different graphics/designs, wherein it is possible, in particular, by means of a corresponding design of the exterior light and in particular by means of the control logic provided by the control device, to comply in particular to legal requirements for the light function, and herein in particular the total luminous intensity of the exterior light, which depends on the sum of the light sources operated and possibly their operating mode. This means that due to the independent controllability of the at least two segments of the exterior light, different operating modes are provided by the control device, wherein in each operating mode the requirements for the total luminous intensity, in particular also for at least one further light value, are met, and therefore the total luminous intensity is within a range limited by a minimum value and a maximum value.

The exterior light has an illuminated area which may be formed by one or more lighting units of the exterior light, for example by at least one OLED and/or at least one LED matrix. The illuminated area in turn is divided into segments, each of which is formed by at least one (individual) light source and defines partial areas of the illuminated area. If a segmented OLED is used, the segments result from the segmentation of the segmented OLED, in other words each segment is formed by a partial OLED as a light source. If an LED matrix is used, segments may have one LED as a light source, but additionally or alternatively a plurality of LEDs may also be combined to form one segment.

Thus, in practice the segments may be formed by a segmented OLED of the exterior light and/or at least one LED matrix of the exterior light. Organic light-emitting diodes (OLEDs) have already been proposed for use in motor vehicles for some time. Known techniques allow in particular flat OLEDs to be divided into a certain number of segments which may be controlled independently. Matrices of conventional light-emitting diodes (LEDs) have already been proposed in particular for headlamps, for example, to implement cornering light functions or the like.

Such technologies may therefore be used in order to enable different designs using the same hardware, which should, however, continue to meet all requirements, in particular those relating to approval, i.e., for each operating mode, the control device ensures that the total luminous intensity is within the corresponding range, wherein, of course, the compliance with further requirements may also be established by the control device, which will be discussed in more detail below. Here, use is proposed, in particular for exterior lights whose light functions are not influenced by changes in geometric appearance and which are therefore suitable for special designs, in particular therefore exterior lights which serve to improve the visibility of the pertaining motor vehicle as a light function. In particular, the at least one exterior light may be a rear light and/or a daytime running light. In such exterior lights, no further light functions, such as, for example, adjustable illumination areas, are usually provided, wherein the concept proposed herein, is in principle also suitable for other exterior lights, such as headlights, if it is always used within the framework of a standard mode, for example normal low beam lights.

The lighting device according to the present disclosure makes it possible to provide both compliance with the requirements, in particular those relating to approval and/or specified by law, and high-quality design, in particular design that may be customized. The basic light technologies required for this purpose, such as, for example, LED matrices and/or segmented OLEDs, are already available as the current state of the art and ready for use.

The present disclosure makes it possible to manufacture exterior lights independently of the design later to be used in a motor vehicle for a number of different desired designs, since the geometric manifestation is provided by the specific operating mode to be used, and, for example, may be selected differently during the vehicle configuration for exterior lights having the same design. In particular, however, it is also conceivable with particular advantage to change the operating mode during use, especially in a user-controlled manner, in order to provide a design that may be customized. In other words, customized design is provided not only during the vehicle configuration but also during use, in particular also integrated into an expanded digital business model. The present disclosure provides the possibility of, in particular, user-side selectability and/or adjustability of different geometric manifestations, thus different light designs, for the at least one exterior light when at least one requirement is met, in this case at least one requirement with respect to the luminous intensity, of a predetermined set of requirements.

Within the scope of the present disclosure, two alternative embodiments, thus two implementation strategies, are conceivable, which enable both variable, in particular customizable, light design for the exterior light and the compliance with requirements of the set of requirements, in particular with respect to the aforementioned light values.

In a first alternative embodiment, it may therefore be provided that the control device is designed for forcibly operating at least a first one of the segments in each operating mode. This means that in this first principle a static luminous portion of the exterior light, namely the first segment, is defined, wherein this first segment ensures at least one requirement for the exterior light, specifically its light function. This static luminous portion is combined with a variable portion, i.e., the remaining or respectively second segments, which serves as a surface for personalization/design customization. Specifically, it may be provided that the at least one first segment forms and/or defines an outer boundary of the exterior light and/or the control device in each operating mode operates the at least one first segment to ensure the presence of the minimum value of the luminous intensity. The first segment can therefore have, for example, a fixed area and a specific luminance in order to meet the minimum requirements, in particular those required by law, for example to ensure a minimum luminous intensity over the required solid angles. The at least one first segment operated in principle is supplemented by one or more variable second segments which reproduce the variable portion of the light function. In this case, the overall design, i.e., first and second segments, may be such that, in an expedient embodiment, when all first and second segments are operated (with dimmability at maximum brightness), the total luminous intensity is below the maximum value, since the corresponding requirements for the total luminous intensity are then automatically met by all conceivable operating modes. In addition to meeting requirements for the total luminous intensity for the light function, in particular rear light and/or daytime running light, such first segments may also be used to specifically meet requirements regarding the extension of the geometric manifestation of the exterior light, for example minimum expansions and/or necessarily required positions. Then, as first segments may be utilized, in particular static edge region segments that may be operated in any operating mode, which are thus excluded from the variable operation in the different operating modes. Thus, for example, an edge circumscribing the area of the exterior light or a corner point configuration of this area may be present in principle for any requirements and may not remain variable.

It should be noted at this point that in general the control device may also be designed in another way to comply with requirements for the geometric manifestation, in particular minimum extensions and/or predetermined lighting positions, for example does not permit operating modes in which the requirements for the geometric manifestation are not met, in particular with regard to legal and/or approval conditions.

According to a second, alternative embodiment, it may be provided that the control device is designed to selectively operate all segments in the various operating modes such that the total luminous intensity of the exterior light is within the range limited by the minimum value and the maximum value. This means that the second principle is based on an exterior light with exclusively customizable segments and in this context defines minimum requirements for the individual operating modes, thus the individual luminous partial areas (segments), in order to nevertheless met the at least one requirement in each operating mode, in particular with respect to the luminous intensity. Of course, further requirements regarding the light values can also be taken into account here by the control device for all operating modes, for example with regard to position, brightness and number of active, hence operated, segments.

Therefore, the first principle, i.e., the first embodiment, relates to the use of a defined area, that is to say the area of the at least one first segment, in order to meet requirements, the second principle relates to the compliance with requirements by function logic within the overall customizable illuminated areas of the exterior light as a minimum configuration.

In a general development of the present disclosure, it may be provided that the control device has a storage means in which data sets describing the operating modes are stored, wherein the control device is designed to create and/or modify at least one of the data sets and/or to select one of the operating modes as a function of user input data received from an input device of the motor vehicle. This means that an input device of the motor vehicle may be used to receive user input data, in particular in a user interface that is provided specifically, possibly even by the control device itself. For example, in such a user interface it is conceivable to provide a graphical representation of the exterior light and its segments, wherein different operating modes may be indicated to a user, in particular a driver of the motor vehicle, by different highlighting of operated and non-operated segments. This allows the driver not only to select a geometric manifestation according to their taste and thus to an operating mode from a predetermined set of operating modes, but also, in exemplary embodiments, to create operating modes and/or to change existing operating modes themselves, for example by interacting with individual segments, in particular in the case of an input device comprising a touchscreen. Expediently, if the compliance with the requirements for the light function is not already ensured by means of static portions, a boundary condition algorithm may be used on the part of the input device, which prevents, in accordance with the requirements of the set of requirements, in particular those also stored in the memory means of the control device, inadmissible geometric manifestations, i.e., those which do not meet these requirements, and thus operating modes. If, for example, a user attempts to deactivate too many segments by means of the input device, so that the minimum value for the total luminous intensity is no longer guaranteed, a corresponding input may be rejected, if necessary, accompanied by the output of a message.

Thus, the ability to process user input data in the control device enables personalization of the visual appearance of the exterior light not only in the vehicle configuration, but also during use. In particular, a digital business model may be superimposed, which, for example, unlocks certain operating modes that were previously reserved for a higher equipment class in return for payment and the like. For this purpose, the control device may also communicate directly or indirectly with a server, from which data sets for further operating modes may also be downloaded, if necessary.

In particular in the case of a larger number of segments, the user-side adjustment of the geometric manifestation, that is to say of an operating mode, may also be facilitated by specifying certain light patterns for the user-side selection. Thus, it may be provided that, in particular in the case of segments with a plurality of light sources which may be controlled independently by the control device and/or a large number, in particular more than eight, of segments of a segment group, a plurality of predetermined light patterns for a plurality of segments and/or light sources are stored in the storage means for selection by the user.

In an expedient development of the present disclosure, it may be provided that the control device is designed to regulate the brightness of individual, in particular all, light sources and/or segments, in particular by selecting a direct current amplitude and/or by pulse width modulation, wherein at least two of the operating modes are characterized by different brightnesses of a specific light source and/or of a specific segment, in particular for remaining within the range for the luminous intensity. By regulating the brightness of individual segments, thus a dimmability, a further degree of freedom is provided for the control device, which may be used, for example, to prevent the maximum value for the luminous intensity from being exceeded in certain operating modes. It may also be used, for example, to enable the minimum value to be reached for segments that are operated less frequently. As will be explained in more detail, dimmability also contributes to providing an equal contribution to the luminous intensity for all segments in certain control principles. In order to establish such a dimmability, for example, linear dimming may be achieved by adjusting the current amplitude and/or pulse width modulation (PWM).

In this context, it may be provided that the control device for adjusting the brightness for at least the segments of different size and/or light source number that may be variably controlled with respect to the operating modes is designed such that at least all of the segments that may be variably controlled with respect to the operating modes have the same luminous intensity during operation. In this way, a particularly simple combination of operating modes may be achieved with regard to the total luminous intensity, as it is possible to work with fixed values.

In this regard, however, it may also be provided that at least the segments that are variably controllable with respect to the operating modes have the same luminance and/or emission characteristics. This also results in an overall simplified control with respect to the composition of operating modes and/or the verification of the compliance with requirements, in particular with regard to the luminous intensity.

In particular, in an advantageous embodiment, the control device may generally be designed to use at least two operating modes which describe a fixed specification of the number and/or dimming for operating the segments and have the same total luminous intensity. This means that, for example, a fixed specification of the number of luminous segments and their dimming may be provided, which makes it possible to switch between two geometric manifestations without changing the total luminous intensity. This requires that each individual segment has the same luminance and emission characteristics during operation, which may be made possible, for example, by segmented OLED light sources. Of course, it is also possible, as described, to compensate for differences in the size or number of the light sources by corresponding adjustment of the brightness (dimming) in order to enable a corresponding composition. If the total luminous intensities for at least some of the operating modes correspond, this is also useful when switching during use, in particular operation, of the motor vehicle, since then no noticeable change in luminous intensity occurs, for example for other road users.

The present disclosure also relates to a motor vehicle having at least one lighting device according to the present disclosure. All embodiments relating to the lighting device according to the present disclosure may be applied analogously to the motor vehicle according to the present disclosure, with which the advantages mentioned above therefore may also be obtained. In particular, the motor vehicle may also comprise an input device associated with the lighting device in order to create, modify and/or select operating modes.

Finally, the present disclosure also relates to a method for operating a lighting device for a motor vehicle, wherein the lighting device has at least one exterior light and a control device, wherein the exterior light has at least two independently controllable segments with at least one light source, which is characterized in that the control device operates the exterior light in at least two operating modes, to each of which a geometric manifestation of the exterior light defined by the light sources operated in the operating mode is associated such that the total luminous intensity of the exterior light is withing a range limited by a minimum value and a maximum value.

Here, too, the minimum value and the maximum value may be defined by requirements, in particular legal and/or approval requirements, wherein, of course, further requirements may also be taken into account, in particular regarding the extent and/or position of the geometric manifestation, of a set of requirements. Overall, the implementations regarding the lighting device according to the present disclosure also apply with respect to the method according to the present disclosure, so that the advantages already described may also be achieved with the method.

Additional advantages and details of the present disclosure are shown in the embodiments described hereinafter and from the drawing.

FIG. 1 illustrates a schematic diagram of a motor vehicle 1 according to the present disclosure. The motor vehicle 1 has a lighting device 2 according to the present disclosure, which in addition to a control device 3 herein has two rear lights 5 and two daytime running light lights 6 as exterior lights 4. The control device 3 is associated with an input device 7 of the motor vehicle 1, which may preferably comprise a touch screen.

Each of the exterior lights 4 comprises an illuminated area having a plurality of light sources, which is divided into a plurality of segments each of which has at least one light source. The segments may be controlled independently of one another, in the present case by the control device 3. The control device 3 is now designed to operate each of the exterior lights 4 in at least two operating modes such that the total luminous intensity of the exterior light is within a range limited by a minimum value and a maximum value. In addition to maintaining of the total luminous intensity within the limited range, at least one further requirement of a set of requirements is preferably taken into account by the control device such that it is met for each of the operating modes. Further requirements may relate, for example, to illuminated positions and/or to the illuminated spatial extension resulting from the operated segments. With regard to the luminous intensity, it should also be noted at this point that corresponding requirements, thus ranges limited by minimum values and maximum values, may of course also be defined for different solid angle ranges. For example, a main emission range in which the exterior light 4 is to be sufficiently clearly visible may be defined without dazzling. However, it is common to specify minimums and maximums via the solid angle distribution, which may be mapped accordingly in the requirements. Requirements of the set of requirements, i.e., in particular the minimum value and the maximum value for the luminous intensity, may result from legal regulations, approval regulations and the like. Here, it should also be noted at this point that total luminous intensity is to be understood as the resulting luminous intensity taking into account all operated segments.

A defined geometric manifestation of the exterior light, which is associated with the corresponding operating mode, results from each of the operating modes in which different segments are operated. Such an adaptable or, in particular, selectable geometric manifestation of the exterior light may be understood as a design.

The exterior lights 4 may have an at least substantially planar illuminated area, each of which is partially covered by one of the segments. As a result of the independent controllability of the segments, corresponding partial areas of the illuminated area may be illuminated, resulting in a geometric pattern (light pattern), i.e., the geometric manifestation of the exterior light 4.

The corresponding design of the exterior lights 4 and the associated configuration of the control device 3, as described, enable user-side selectability and/or adjustability of different geometric manifestations, hence different light designs, for each exterior light 4 when the at least one requirement of a predetermined set of requirements is met, as will be explained in more detail below with reference to specific examples.

Figure 2:
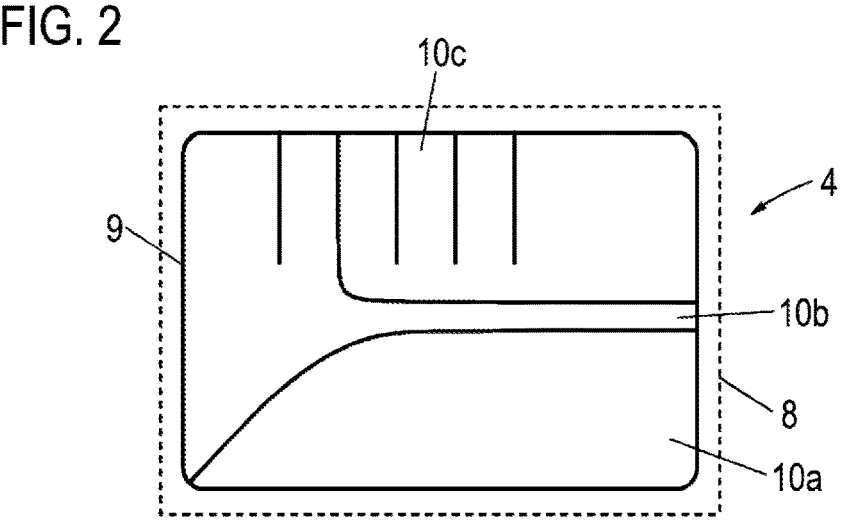
FIG. 2 illustrates a first operating mode in a first embodiment of an exterior light.
Figure 3:
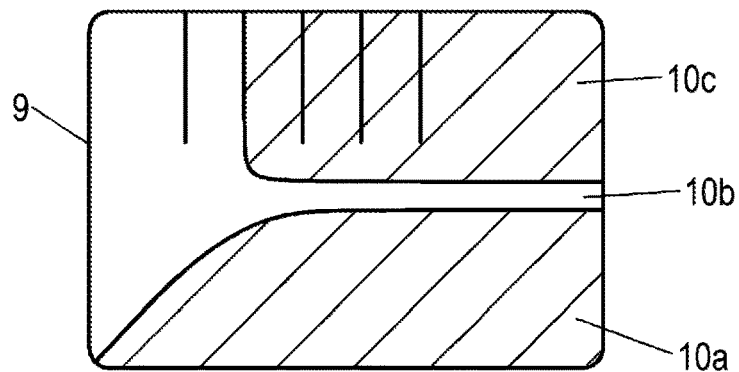
FIG. 3 illustrates a second operating mode of the first embodiment of the exterior light.
Figure 4:
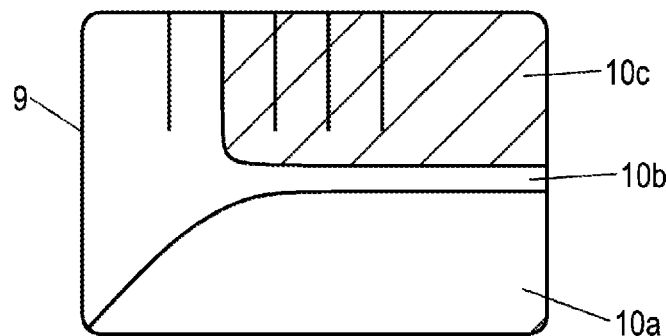
FIG. 4 illustrates a third operating mode of the first embodiment of the exterior light.

Thus, FIGS. 2 to 4 illustrate a first, specific exemplary embodiment of an exterior light 4, in the example shown a rear light 5 (tail light), and its control according to the present disclosure. Here, in order to show the operation in different operating modes, a non-hatched segment is to be understood as being switched on, and a segment shown in a hatched manner as not being switched on.

As can be seen, for example, in FIG. 2, the exterior light 4 comprises a segmented OLED 9 in a housing 8, which in the present case has three segments 10a, 10b and 10c which may be controlled independently by the control device 3, which therefore all form a separate light source (part OLED). In the operating mode shown in FIG. 2, all three segments 10a, 10b and 10c are operated; in the operating mode shown in FIG. 3 only segment 10b is operated, but not segments 10a and 10c. In the operating mode shown in FIG. 4, only segments 10a and 10b are operated; segment 10c remains dark.

In this simple first embodiment illustrated with reference to FIGS. 2 to 4, segment 10b may be designated as a first segment which, on the one hand, ensures that the minimum value of the total luminous intensity is reached, but, on the other hand, also ensures that the visible portion of the exterior light 4 extends over the entire width in order to meet, as a further requirement, a spatial dimension requirement. Thus, if the segment 10b is used as the first segment accordingly, this segment is therefore basically operated in all operating modes and ensures that these requirements, i.e., the requirement regarding the minimum luminous intensity and the horizontal spatial extent, are met.

However, in the embodiment of FIGS. 2 to 4, a second inventive embodiment is also conceivable, in which no first segment, which is always to be operated, is specified, but the control device 3 for the operating modes, in particular when selected by the user, itself checks and ensures that the requirements of the set of requirements are met in each case. This may already be reported back to the user when a user creates and/or modifies an operating mode via the input device 7 by avoiding impermissible operating modes that violate a requirement from the outset. For this purpose, a boundary condition algorithm may be provided in the input device 7.

By way of example, these and the following embodiments of exterior lights 4 continue to refer to the use of segmented OLEDs, but may of course also be implemented with LED matrices. For LED matrices, segments may be defined as individual LEDs and/or groups of LEDs.

Figure 5:
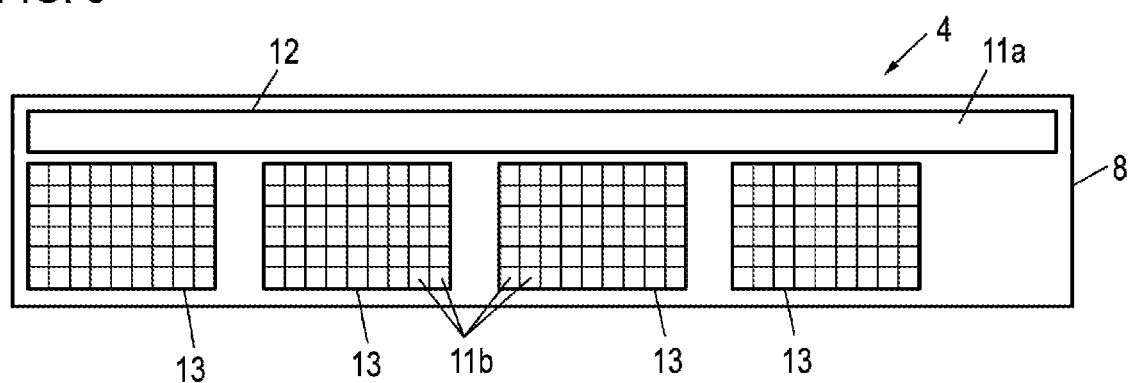
FIG. 5 illustrates a first operating mode of a second embodiment of the exterior light.
Figure 6:
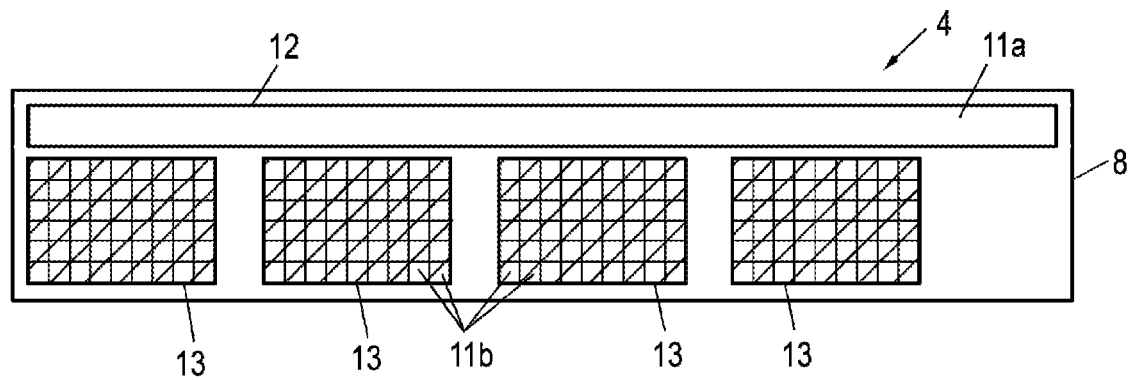
FIG. 6 illustrates a second operating mode of the second embodiment of the exterior light.
Figure 7:
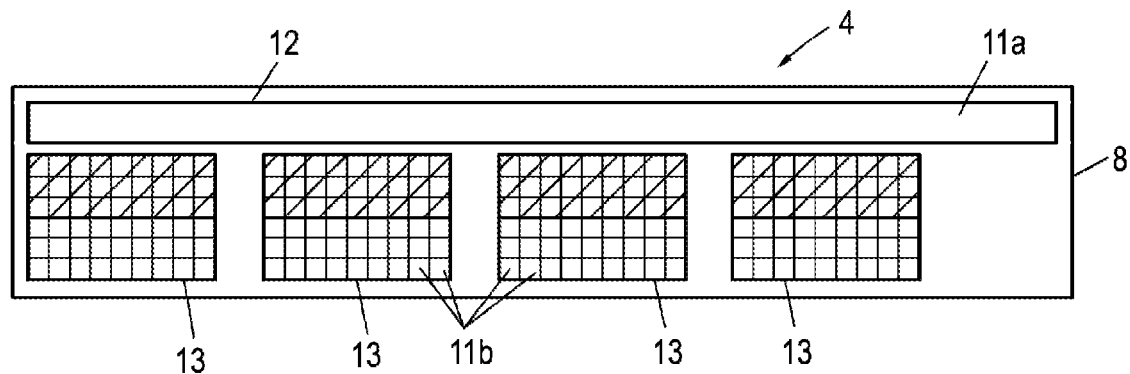
FIGS. 7 to 9 illustrate further operating modes of the second embodiment of the exterior light.
Figure 8:
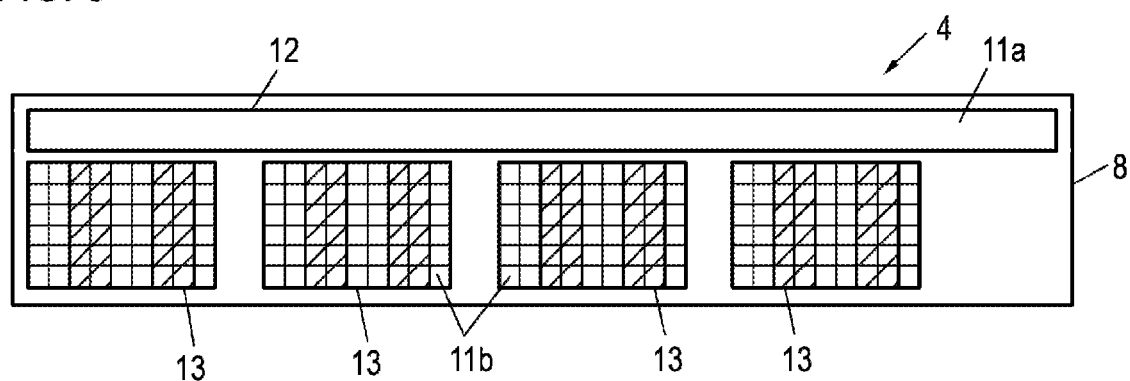
Figure 9:
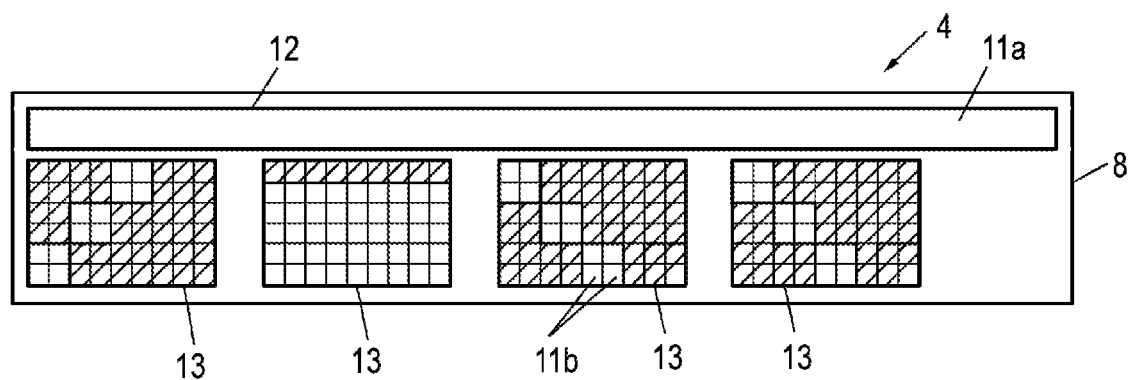

FIG. 5 illustrates a second embodiment of an exterior light 4, which may be used as a rear light 5 and a daytime running light lamp 6 and, again in a housing 8 has, by way of example, an LED 12 forming a first segment 11a in exactly the same way as four segmented OLEDs 13, the individual partial OLEDs of which form further, second, independently controllable segments 11b as light sources. The segment 11a, formed by a single light source (the LED 12), in turn forms a first segment, is therefore operated by the control device 3 in each operating mode in order to ensure the minimum value of the total luminous intensity and the spatial extent in width. However, all other segments 11b may be operated in a freely selectable manner, as shown by the various operating modes indicated by FIGS. 5 to 9. While in FIG. 5 all segments 11a, 11b are operated, in FIG. 6 only segment 11a is operated. FIGS. 7 to 9 each illustrates a partial operation of segments 11b in different geometric manifestations, and therefore with different designs.

Figure 10:
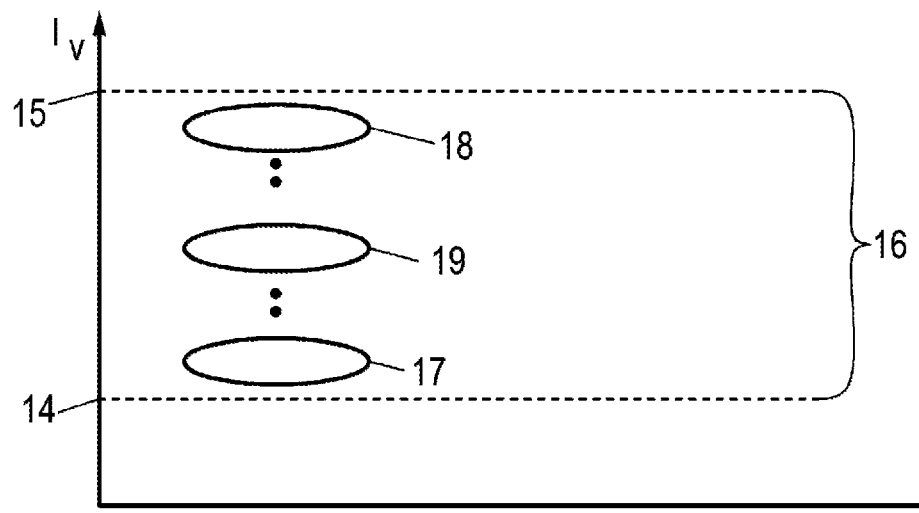
FIG. 10 illustrates luminous intensities for the second embodiment of the exterior light.

FIG. 10 illustrates a schematic diagram of the total luminous intensity Iv for the second embodiment of FIGS. 5 to 9, wherein the range 16 defined by the minimum value 14 and the maximum value 15 according to requirement is also shown. As can be seen, the individual light sources or respectively segments 11a, 11b are designed such that, during operation of only the first segment 11a, cf. marking 17 (corresponding to FIG. 6), the total luminous intensity is just above the minimum value 14. In contrast, during operation of all segments 11a, 11b according to FIG. 5 and thus all light sources, the total luminous intensity, cf. marking 18, is just below the maximum value 15. The remaining operating modes of FIGS. 7 to 9 lie between the markings 17 and 18, with only the case of FIG. 7 being shown as an example as marking 19, in which half of the segments 11b are operated.

It should be noted at this point that it is also conceivable in the embodiment of FIGS. 5 to 9 that the individual light sources and thus the segments 11a, 11b may be adjusted in their brightness, for example by means of linear dimming via the current amplitude and/or by pulse width modulation dimming (PWM dimming). Then further degree of freedom exists, which may be used to remain within the range 16.

Figure 11:
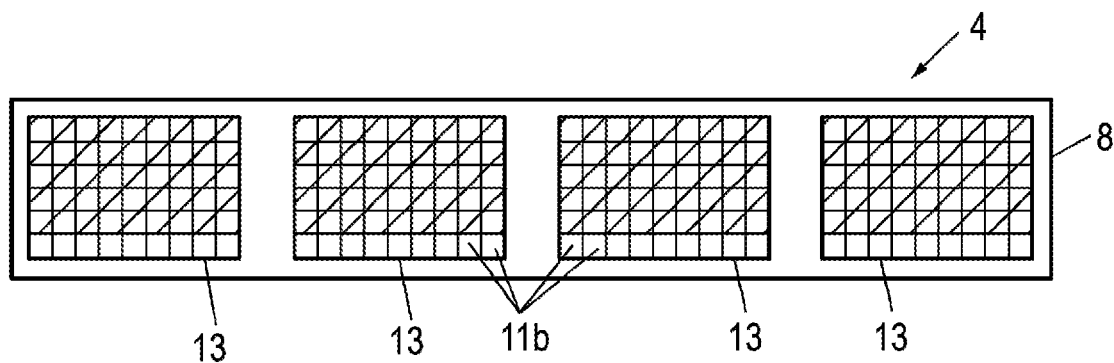
FIG. 11 illustrates a first operating mode of a third embodiment of an exterior light.
Figure 12:
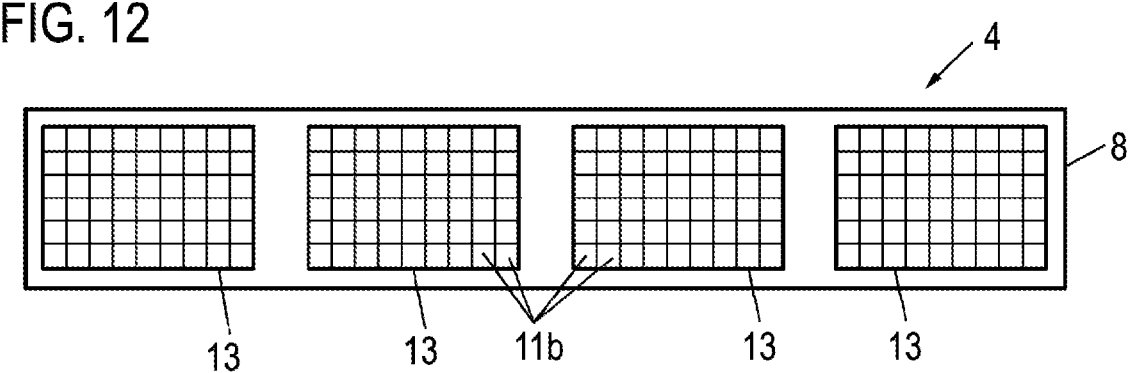
FIG. 12 illustrates a second operating mode of the third embodiment of the exterior light.

FIGS. 11 and 12 illustrate by way of example a third embodiment of an exterior light 4, which in this case corresponds to the second embodiment without segment 11a, and therefore only the OLEDs 13 comprising the individual partial OLEDs each defining segments 11b in the housing 8. In this case, compliance with the minimum value 14 and the spatial expansion requirement is not ensured by the operation of the segment 11a in all operating modes, but the control device 3 checks the requirements for all operating modes such that the requirements of the set of requirements are complied with as a whole.

Figure 13:
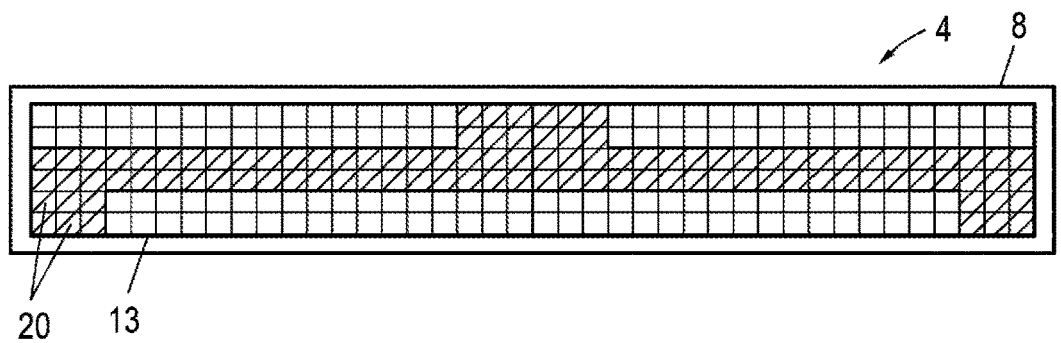
FIG. 13 illustrates a first operating mode of a fourth embodiment of an exterior light.
Figure 14:
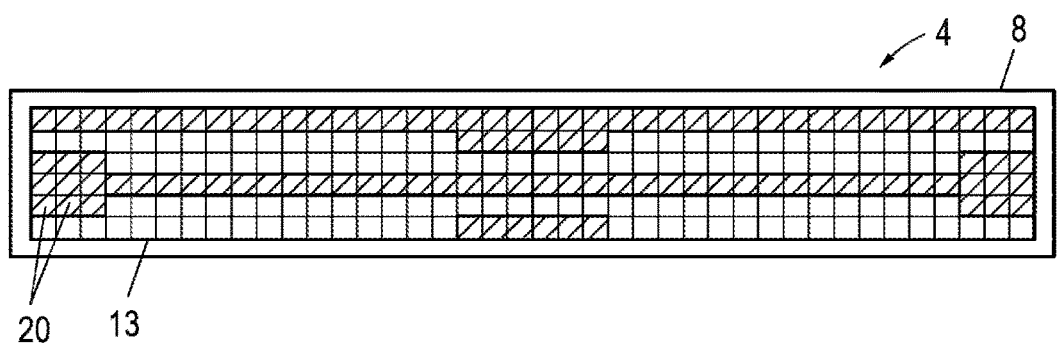
FIG. 14 illustrates a second operating mode of the fourth embodiment of the exterior light.

A fourth embodiment of an exterior light 4 according to FIG. 13 and FIG. 14 comprises only a single segmented OLED 13, the individual partial OLEDs each of which, as light sources, in turn define a segment 20, wherein here all segments 20 may also be controlled independently of one another. In this case, all segments 20 are operated with the same brightness, and consequently the same luminance and the same emission characteristic, so that a fixed specification of the number of illuminated segments 20 for the operating modes can easily ensure that it is possible to switch between two designs, i.e., two operating modes, without changing the total luminous intensity. This may also be made possible with LEDs of an LED matrix as light sources. Consequently, the same total luminous intensity results for FIGS. 13 and 14 despite completely different designs, since exactly the same number of segments 20 are operated.

Figure 15:
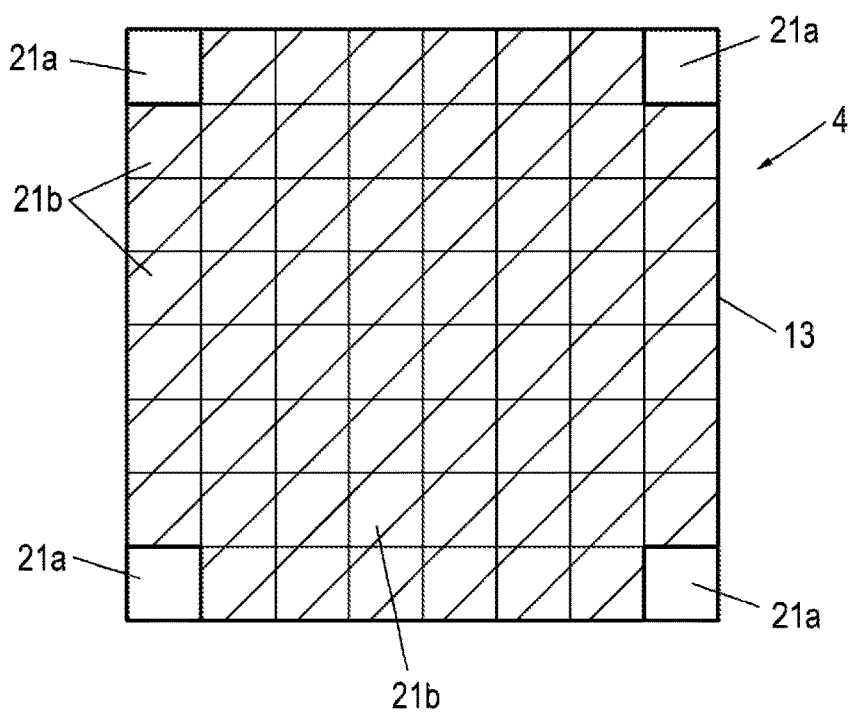
FIG. 15 illustrates a fifth embodiment of an exterior light.

FIG. 15 illustrates, with reference to a fifth embodiment of an exterior light 4 having a segmented OLED 13 whose individual partial light-emitting diodes in turn define segments 21a, 21b, how a requirement for limit dimensions of the exterior light 4 may be met by defining constant, always operated segments 21a of the edge region. In this case, the segments 21a also form first segments which are to be operated statically in each of the operating modes, so that the circumscribed area of the entire exterior light 4 is the same for all operating modes. In other embodiments, all of the edge segments 21a, 21b may also be used as first segments, so that the limitation is always completely circumscribed.

Finally, it should be noted that, where appropriate, features are of course transferable between the different embodiments, for example with regard to the dimmability of the light sources of individual segments, the design of first segments, the use of LED matrices/OLEDs, and certain control variants. Segments may generally also be formed by a plurality of light sources, for example a plurality of LEDs.

In addition, as shown in FIG. 1, the control device 3 may, in addition to a processor 22, also have a storage means 23 in which data sets for different operating modes are stored, one of which may be selected by a user, for example, via the input device 7. Further data sets may also be downloaded, for example from the Internet, for example after the user has paid a corresponding consideration. In some exemplary embodiments, the user may also use the input device 7 to create new data sets, and therefore new operating modes, and to modify them.

The invention claimed is:

1. A lighting device for a motor vehicle, the lighting device comprising:
    an exterior light, wherein the exterior light has an illuminated area having at least two segments, wherein the at least two segments are each independently controllable, and wherein each of the at least two segments comprises at least one light source; and
    a control device configured to operate the exterior light in at least two operating modes,
    wherein each of the at least two operating modes is associated with a geometric manifestation of the exterior light defined by the at least one light source operated in each operating mode,
    wherein a total luminous intensity of the exterior light is within a range limited by a minimum value and a maximum value for all operating modes, and
    wherein an equal contribution to the total luminous intensity is provided for the at least two segments to compensate for a difference in a size or a number of the at least one light source.

2. The lighting device according to claim 1,
    wherein the at least two segments are formed by a segmented OLED of the exterior light and/or at least one LED matrix of the exterior light, and/or
    wherein the exterior light is a rear light and/or a daytime running light.

3. The lighting device according to claim 1, wherein the control device is configured to operate a first segment of the at least two segments in a non-optional manner in each operating mode.

4. The lighting device according to claim 3,
    wherein the first segment forms an outer boundary of the exterior light, and/or
    wherein the control device operates the first segment in each operating mode to ensure a compliance with the minimum value of the total luminous intensity.

5. The lighting device according to claim 1, wherein the control device is further configured to selectively operate all segments in the at least two operating modes such that the total luminous intensity of the exterior light is within the range limited by the minimum value and the maximum value.

6. The lighting device according to claim 1, wherein the control device comprises a data storage, wherein the data storage stores data sets describing the at least two operating modes, wherein the control device is further configured to:
create at least one of the data sets;
modify the at least one of the data sets; and/or
select one of the at least two operating modes depending on input data from a user, the input data being obtained from an input device of the motor vehicle.

7. The lighting device according to claim 6, wherein the data storage stores, for selection by the user, a plurality of predetermined light patterns for the at least two segments or the at least one light source.

8. The lighting device according to claim 1, wherein the control device is further configured to regulate brightness of individual light sources or individual segments, wherein at least two of the at least two of the operating modes are characterized by different brightness of a specific light source or a specific segment.

9. The lighting device according to claim 1, wherein some or all of the at least two segments have a same luminous intensity and/or a same emission characteristic, and each of the some or all of the at least two segments is variably controlled with respect to the at least two operating modes.

10. The lighting device according to claim 9, wherein each of the some or all of the at least two segments that is variably controlled with respect to the at least two operating modes has a same luminous intensity during operation.

11. The lighting device according to claim 1,
wherein the control device is further configured to use the at least two operating modes,
wherein the at least two operating modes specify a number or a dimming of the at least two segments, and
wherein the at least two segments have a same total luminous intensity.

12. A motor vehicle comprising a lighting device, wherein the lighting device comprises:
an exterior light, wherein the exterior light has an illuminated area having at least two segments, wherein the at least two segments are each independently controllable, and wherein each of the at least two segments comprises at least one light source; and
a control device configured to operate the exterior light in at least two operating modes,
wherein each of the at least two operating modes is associated with a geometric manifestation of the exterior light defined by the at least one light source operated in each operating mode,
wherein a total luminous intensity of the exterior light is within a range limited by a minimum value and a maximum value for all operating modes, and
wherein an equal contribution to the total luminous intensity is provided for the at least two segments to compensate for a difference in a size or a number of the at least one light source.

13. A method for operating a lighting device for a motor vehicle, the lighting device having an exterior light and a control device, the exterior light having an illuminated area with at least two segments that are independently controllable, and each of the at least two segments comprising at least one light source, the method comprising:
operating, by the control device, the exterior light in at least two operating modes,
wherein each of the at least two operating modes is associated with a geometric manifestation of the exterior light defined by the at least one light source operated in each operating mode,
wherein a total luminous intensity of the exterior light is within a range limited by a minimum value and a maximum value for all operating modes, and
wherein an equal contribution to the total luminous intensity is provided for the at least two segments to compensate for a difference in a size or a number of the at least one light source.

14. The lighting device according to claim 1, wherein each operating mode changes during both a configuration and a use of the motor vehicle to provide the geometric manifestation of the exterior light.

15. The motor vehicle according to claim 12, wherein each operating mode changes during both a configuration and a use of the motor vehicle to provide the geometric manifestation of the exterior light.

16. The method according to claim 13, wherein each operating mode changes during both a configuration and a use of the motor vehicle to provide the geometric manifestation of the exterior light.

* * * * *